Jan. 25, 1966   M. GOLDMAN ETAL   3,231,642
EXTRUSION AND STRETCHING OF THERMOPLASTIC FILM
Filed July 9, 1964   4 Sheets-Sheet 1

INVENTORS
MAX GOLDMAN
MIKLOS WALLENFELS

BY Robert W. Black

ATTORNEY

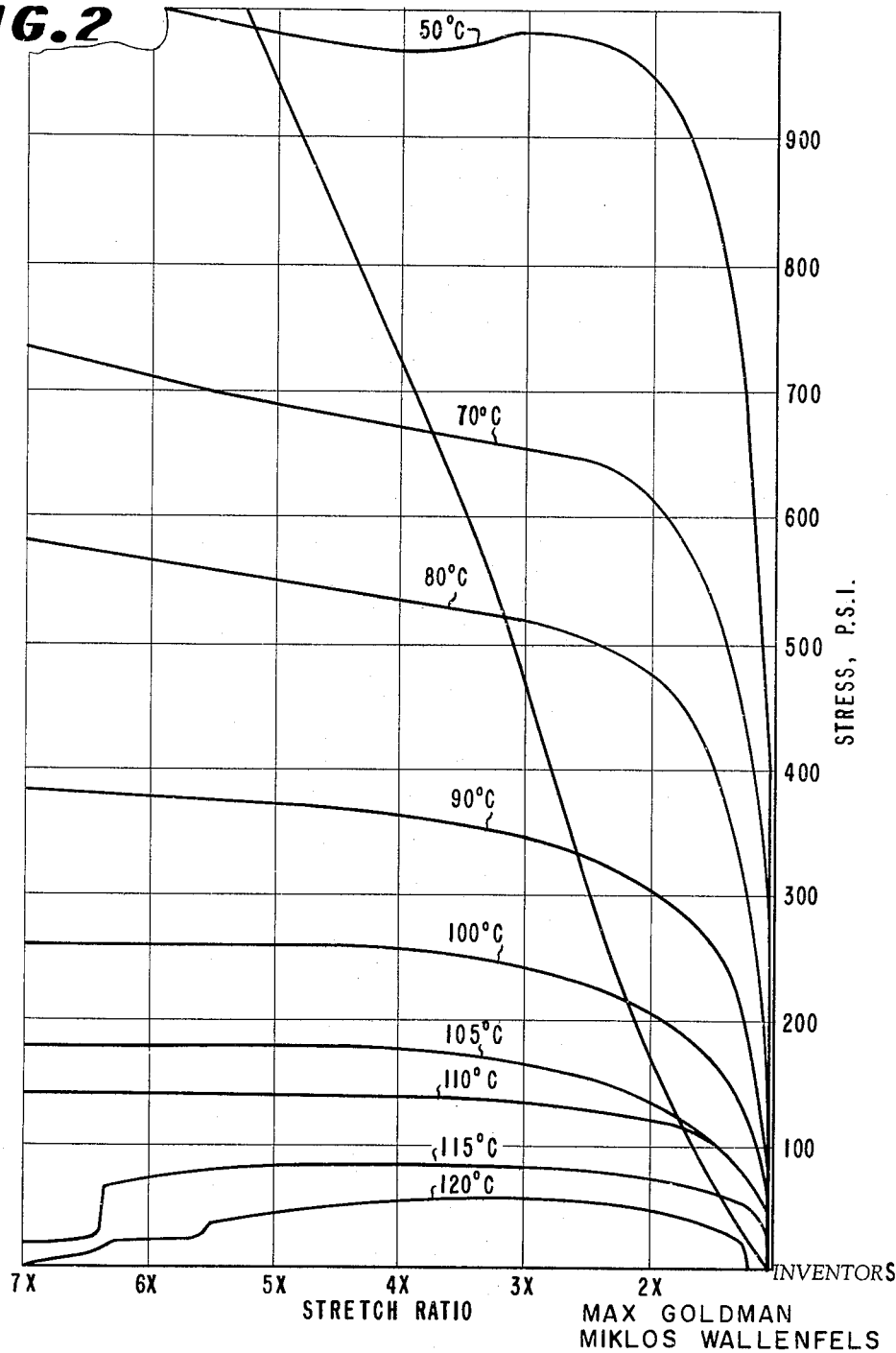

Jan. 25, 1966    M. GOLDMAN ETAL    3,231,642
EXTRUSION AND STRETCHING OF THERMOPLASTIC FILM
Filed July 9, 1964    4 Sheets-Sheet 3
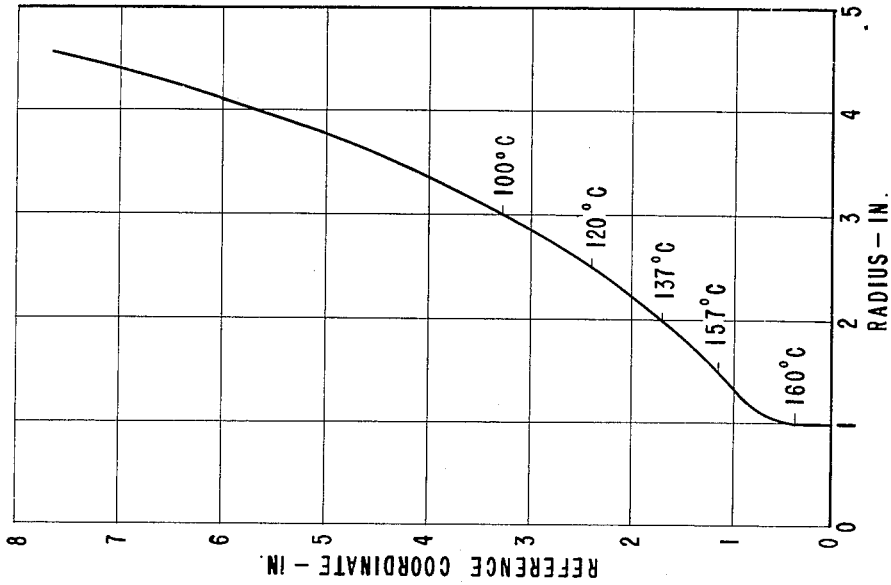
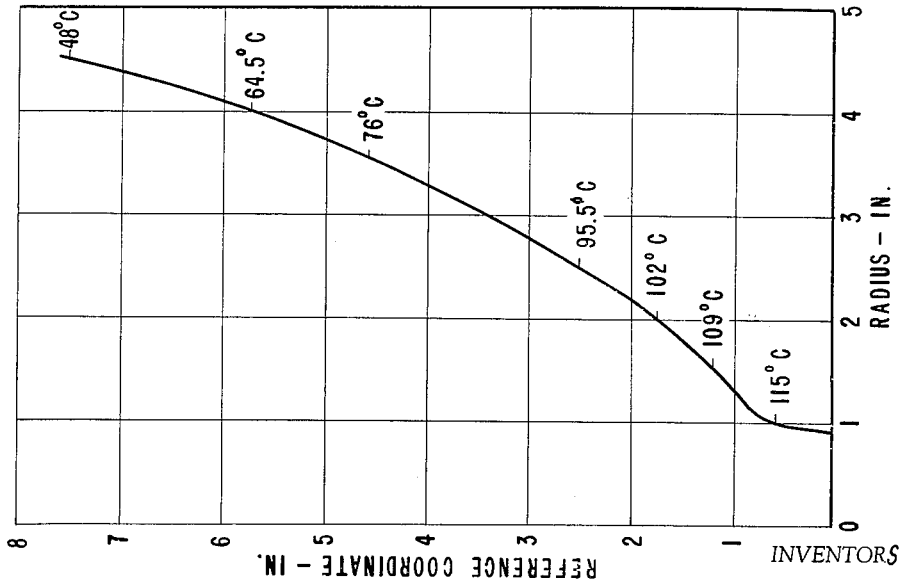
INVENTORS
MAX GOLDMAN
MIKLOS WALLENFELS
BY
ATTORNEY

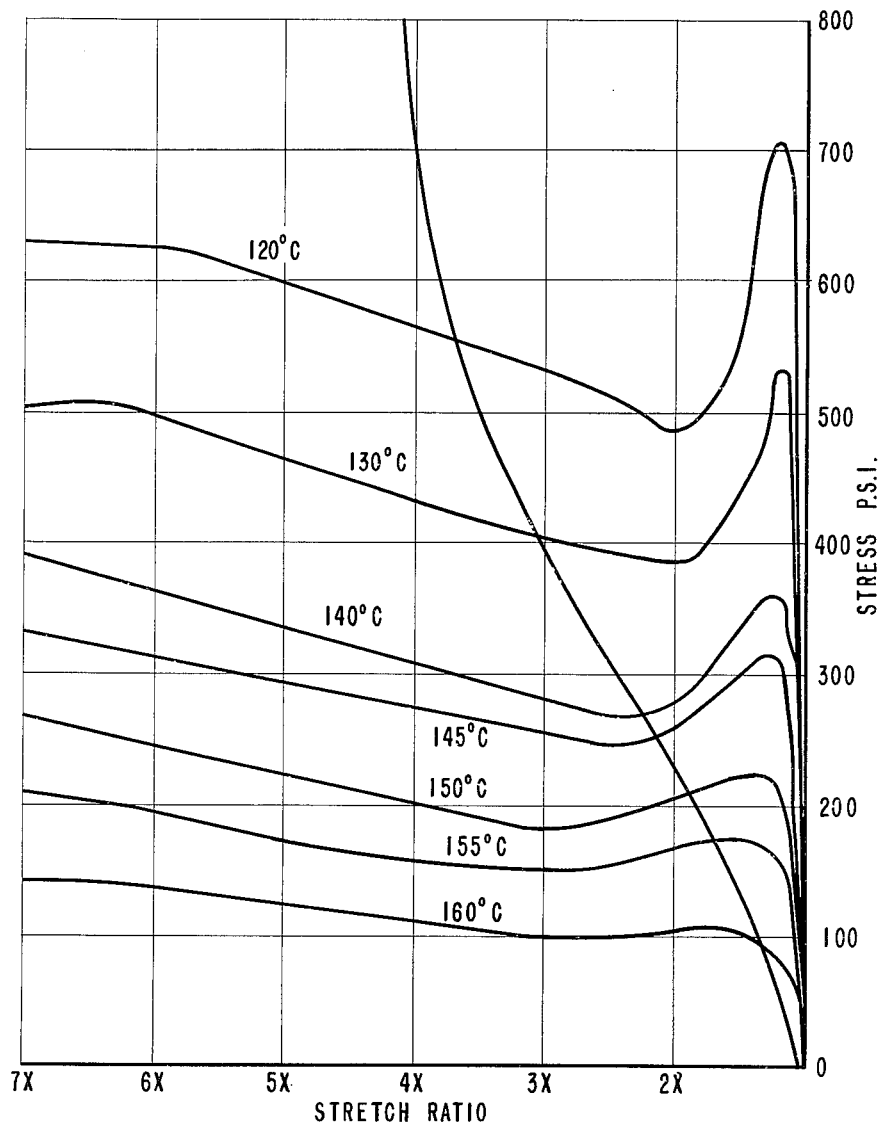

United States Patent Office 3,231,642
Patented Jan. 25, 1966

3,231,642
EXTRUSION AND STRETCHING OF
THERMOPLASTIC FILM
Max Goldman, Tonawanda, and Miklos Wallenfels, Buffalo, N.Y., assignors to E. I. du Pont de Nemours and Company, Wilmington, Del., a corporation of Delaware
Filed July 9, 1964, Ser. No. 381,304
11 Claims. (Cl. 264—25)

This application is a continuation-in-part of copending application Serial No. 51,629, filed August 24, 1960, and now U.S. Patent No. 3,141,912.

This invention relates to the orientation of thermoplastic polymeric film. More particularly, it relates to a method for orienting by a combination of expansion and longitudinal stretching to improve the properties of thermoplastic, polymeric, tubular film.

The idea of orienting under controlled conditions, particularly at a controlled temperature, to improve the physical properties of thermoplastic polymeric film, is not new. The idea of expanding a thermoplastic, polymeric, tubular film by providing gas under pressure within the tubular film is not new either. The problem, however, of uniform heat application and, thus, maintaining control over the temperature of the tubular film prior to and during expansion of the film has also prevailed for a long time and is a problem that has discouraged the use of the expansion or blowing process for the orientation of polymeric film.

When heating a moving tubular film with radiant heat followed by heating with internal radiant heat to a temperature at which the tubular film expands, the temperature of the thinner portions of the tubular film is raised to a higher temperature than the thicker portions. This reheating process for expansion tends to impair gauge uniformity since the thinner portions will stretch more under the internally applied given pressure.

It is, therefore, an object of the present invention to provide a process for the orientation of thermoplastic, polymeric film.

It is a further object of this invention to provide a process which improves gauge uniformity of thermoplastic, polymeric tubular film.

A still further object of this invention is a method of achieving and maintaining "cooling curve" stretching of thermoplastic, polymeric tubular film during expansion to provide a process for orienting such film. These and other objects will appear hereinafter.

The manner in which the objects of the invention are attained is set out in the following description and the drawings, in which:

FIGURE 2 is a diagram of an effective stress-strain path for polyethylene at a strain rate of 2000% per minute;

FIGURE 3 is a diagram showing the corresponding film temperature profile for the polyethylene stress-strain path shown in FIGURE 2;

FIGURE 4 is a diagram of an effective stress-strain path for polypropylene at a strain rate of 2000% per minute; and FIGURE 5 is a diagram showing the corresponding film temperature profile for the polypropylene stress-strain path shown in FIGURE 4.

Figure 1:
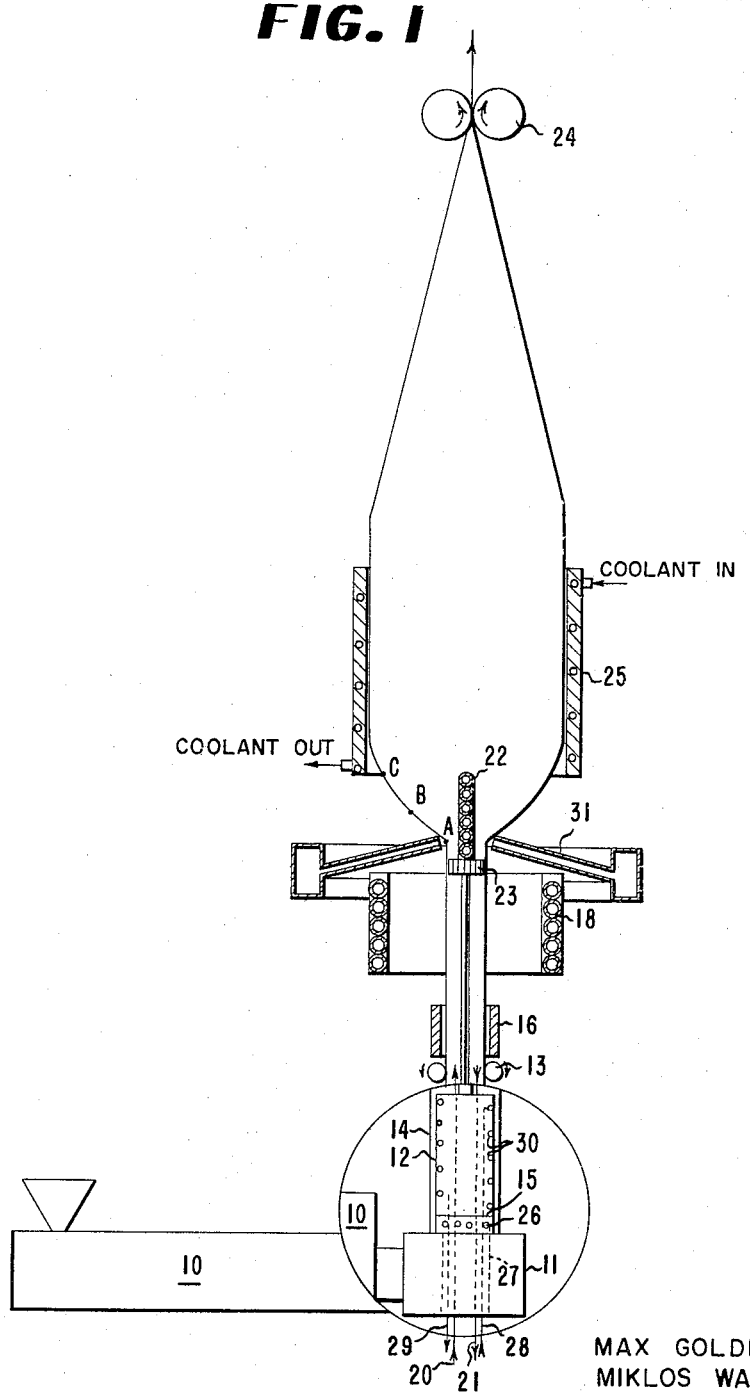
FIGURE 1 is a schematic view, partially in section, of a preferred apparatus adapted to carry out the process of the present invention.

The objects of the invention are accomplished by the process of extruding thermoplastic polymeric material in the form of a film in its formative state; advancing the film at a predetermined rate; quenching the film to a temperature below its formative state; heating the film to a temperature within its orientation temperature range from an incident radiant heat source; stretching the film in at least the transverse direction to an extent of at least 2 times the original dimension of the film while the film is exposed to the incident radiant heat source, the effective radiant heat intensity decreasing with increasing distance from the plane of initial stretching; convection cooling the film during stretching, and thereafter further cooling the film while maintaining the film substantially at its stretched dimension.

The process is preferably the process of extruding thermoplastic polymeric material in the form of a film in its formative state; advancing the film at a predetermined rate; quenching the film to a temperature below its formative state; heating the film to a temperature within its orientation temperature range; stretching the film in the longitudinal and transverse directions to an extent of at least 2 times the original dimensions of the film to orient the film; continuing heating the film, while stretching at least in the transverse direction, from a radiant heat source, the effective radiant intensity decreasing with increasing distance from the plane of initial stretching, to a temperature within the orientation temperature range, said stretching corresponding to an effective stress-strain path on which the stretching film intersects a multiplicity of isothermal stress-strain curves from the initial orientation temperature isothermal stress-strain curve to the final temperature isothermal stress-strain curve at which point the maximum transverse direction stretching occurs; convection cooling the film while stretching at least in the transverse direction, preferably, the cooling is directed at the pane of initial stretching; and cooling the film while maintaining the film substantially at its stretched dimension.

Further objects are accomplished by a process which involves, first extruding thermoplastic polymeric material in the form of a tubular sheet or film heated to thermoplastic condition, i.e., in a formative state above its crystalline melting point; advancing the tubular sheet at a predetermined initial rate; quenching the tubular sheet by cooling the sheet quickly to a temperature below the formative state, preferably at least 20° C. below the orientation temperature range; maintaining sufficient pressure within the tubular sheet to prevent collapse and to provide, when the tubular sheet is heated to a temperature within its orientation temperature range, an expansion of at least 2 times the original diameter of the tubular sheet; heating the tubular sheet to a temperature between 70% of the lowest temperature range in degrees centigrade and just below the orientation temperature range of the polymeric material, and thereafter, heating the tubular sheet internally from an internally centrally located radiant heat source to a temperature within the orientation temperature range, to expand the tubular sheet to a diameter at least 2 times, preferably 2–10 times its original diameter, said expansion being caried out while said tubular sheet is exposed to said heat source and corresponding to an effectively stress-strain path on which the tubular sheet elongating in two directions intersects a multiplicity of isothermal stress-strain curves from the initial orientation temperature isothermal stress-strain curve to the final temperature isothermal stress-strain curve at which point the maximum transverse direction expansion occurs; convection cooling the tubular sheet while expanding, preferably wherein the convection cooling is directed at the plane of initial expansion; advancing, while expanding, the heated tubular sheet at a rate at least 2 times, preferably 2–10 times the initial rate, preferably the ratio of the final advancing rate to the initial advancing rate being equal to the ratio of the final diameter to the extruded diameter of the tubular sheet; and, finally, cooling the tubular sheet while maintaining the sheet substantialy at its expanded diameter.

The "orientation temperature range," as defined herein, refers to the temperature range in which molecular orientation of a polymeric film may be effected. This range lies somewhere below the melting temperature of a polymer that melts at a specific temperature or below the crystalline melting point of a crystalline polymer that melts over a range of temperatures. The crystalline melting point refers to the temperature at which the crystallites of a crystalline polymer are no longer detectable under X-ray examination when the solid polymer is heated until it melts.

For some crystalline polymers such as polyethylene, polypropylene and other polyhydrocarbons, the orientation temperature range may be the range of temperature over which the crystallites melt but below the temperature at which the crystallites are no longer detectable. In the case of polyesters such as polyethylene terephthalate and the like, the so-called "crystallizable" polymers, the orientation temperature range extends from about 10° C. to 40° C. above the second order transition temperature of the polymer. The second order transition temperature is that temperature at which an essentially amorphous polymer or one that can be quenched as an amorphous polymer but is crystallizable makes a transition from a glossy state to a rubbery state. It is in this rubbery state that the polymer in the form of a film or a filament can be oriented by stretching. The second order transition temperature varies with the molecular weight of the polymer and is defined more completely in U.S. Patent 2,578,899.

The specific orientation temperature range will vary from polymer to polymer but may be determined by experimentation or from the literature. In the following table, Table I, the orientation temperature range, the second order transition temperature and the crystalline melting point are given for some representative amorphous polymers and some "crystallizable" polymers that are amorphous as quenched.

TABLE I

| Polymer | Second-Order Transition Temp. (° C.) | Crystalline Melting Point (° C.) | Orientation Temperature Range (° C.) |
| --- | --- | --- | --- |
| Polyethylene terephthalate | 70 | 255 | 85–110 |
| Polyethylene-2,6-naphthalate | 113 | 265 | 120–140 |
| Polytetramethylene-1,2-dioxybenzoate | 53 | 220 | 70–90 |
| Polyethylene-1,5-naphthalate | 71 | 225 | 80–100 |
| Polyhexamethylene adipamide | 45–50 | 250 | 65–75 |
| Polyhexamethylene sebacamide | 45–50 | 250 | 65–75 |
| Polycaprolactam | 45–50 | 250 | 65–75 |
| 70% ethylene terephthalate/30% ethylene isophthalate copolymer | 51 | 170 | 70–90 |
| Polyvinyl chloride: | | | |
| No plasticizer | 105 | 170 | 115–145 |
| 5% plasticizer | 90 | 170 | 100–130 |
| 10% plasticizer | 75 | 170 | 85–115 |
| 15% plasticizer | 60 | 170 | 70–100 |
| 84% tetrafluoroethylene/16% hexafluoropropylene copolymer | 85 | 275 | 95–125 |
| Polystyrene | None | *88–120 | 88–110 |
| Polymethylmethacrylate | None | *66–111 | 66–105 |

*Softening range rather than crystalline melting point since the polymer is only obtainable as an amorphous polymer.

In the following table, Table II, the orientation temperature range and the crystalline melting point are listed for some representative crystalline polymers.

TABLE II

| Polymer | Density at 20° C. (gm./cc.) | Crystalline Melting Point (° C.) | Orientation Temperature Range (° C.) |
| --- | --- | --- | --- |
| Polypropylene | 0.8825 | 140 | 100–120 |
|  | 0.8912 | 150 | 120–140 |
|  | 0.9014 | 165 | 125–145 |
|  | 0.9092 | 173 | 135–160 |
|  | 0.9123 | 179 | 140–160 |
| Polyethylene | 0.90 | 98 | 50–80 |
|  | 0.92 | 112.5 | 80–110 |
|  | 0.95 | 134 | 120–130 |
| Polyvinyl fluoride | 1.38 | 193–198 | 175–185 |
| Polyvinylidene fluoride | 1.76 | 174 | 150–165 |
| Polyoxymethylene | 1.3–1.5 | 180–185 | 120–180 |

In the following table, Table III, the preferred conditions of this process for several particularly important polymers are listed.

TABLE III

| Polymer | Quench Temp. Range (° C.) | Temp. in Initial Heating Zone (° C.) | Temp. in Final Heating Zone (° C.) | Elongation Range (times original dimensions) |
| --- | --- | --- | --- | --- |
| Polypropylene [1] | 0–40 | 130–145 | 150–159 | 2–10 |
| Polyethylene terephthalate | 20–50 | 60–80 | 85–110 | 2–6 |
| Polyethylene [2] | 0–40 | 80–120 | 100–130 | 2–10 |
| Polyvinyl chloride [3] | 20–40 | 65–80 | 85–115 | 2–6 |

[1] Density above 0.909 gm./cc.
[2] Density above 0.92 gm./cc.
[3] Plasticizer content of 0–15%.

Referring to FIGURE 1, which is a diagrammatic illustration of the process of this invention, the thermoplastic polymer is first heated to a temperature above its melting point in the extruder 10. The molten polymer, preferably at a temperature at least 10° C. above its melting point or crystalline melting point, is extruded through die 11 in the form of a tubular film 14, the tube having a wall thickness of anywhere from 15 to 85 mils. The tubular film is then drawn over a cooling mandrel 12 by means of the tube advancer 13. The tube advancer 13 is composed of two sets of driven rubber squeeze rolls which contact the surface of the cooled tubular film to advance the film at a predetermined initial rate without flattening it. The tube advancer 13 also serves to prevent sway of the film and to insulate the freshly extruded film adjacent the die from the subsequently applied longitudinal tension. Instead of driven rolls, endless belts may be used as the tube advancer.

The cooling or quench mandrel 12 is a hollow metal cylinder insulated from the die by a non-metallic insulating disc 15. The disc has openings 26 around its periphery, the openings communicating with the atmosphere through conduit 27. Coils 30 communicating with inlet and outlet tubes 28 and 29 in the conduit, are disposed adjacent to the interior surface of the mandrel. The coils 30 convey cooling water which serves to reduce the temperature of the tubular film to about room temperature, although any temperature from —10° C. to about 50° C. would be adequate to convert most thermoplastic polymeric films to a non-formative plastic state, i.e., a state where the film resists stretching. Since cooling tends to shrink the thermoplastic polymeric tubular film, the mandrel is preferably tapered to the contour of the shrinking film. If necessary, pressure relief areas such as those disclosed in U.S. Patent 2,987,765 may be provided to isolate the gas pressure downstream of the mandrel 12.

The solidified tubular film is then drawn through a guide ring 16, the ring serving to minimize sway of the tube. Drawing is accomplished by means of a set of nip rolls 24 rotating at a rate that is at least 2 times the rate of the tube advancer 13. Next, the film is advanced through the initial radiant heater 18 concentrically positioned around the periphery of the tubular film, and connected to a power source, not shown. It should be understood that any other means that would serve to heat the outside surface of the tubular film would operate in this invention. The initial radiant heater 18 serves to heat the film to a temperature within about 70% of the lowest temperature of the orientation temperature range to just below the orientation temperature range of the thermoplastic polymer. The precise temperature to which the film is heated in the initial radiant heater 18 will depend upon several factors. For example, the greater the speed of the film, the higher the temperature to which the film must be heated. The greater the intensity of the final internal heater 22, the lower the temperature to which the film need to heated in the initial radiant heater 18.

In cooling curve stretching, cool air at the stretching zone serves to cool the thin portions of film, reinforcing them and, thus, improving gauge uniformity. To exert the desired cooling effect on the tubular film during expansion, an air cooling ring 31 as shown in FIGURE 1 is inserted with the orifice of the cooling ring directed at the plane of initial expansion.

Air or other gaseous medium admitted through inlet 20 and vented through outlet 21 provides the pressure within the tubular film to prevent collapse of the film while the film is at a temperature below the orientation temperature range and to expand the tubular film a predetermined amount when the temperature of the film reaches the orientation temperature range. This circulating air also serves to cool the inside surface of the tubular film. The amount of expansion is dependent upon the pressure within the film, the precise temperature within the orientation temperature range to which the film is brought, the rate of heating the film, the thickness of the film wall, etc., and can either be pre-set by one skilled in the art or set after experimentation.

The tubular film is brought to a temperature within the orientation temperature range and at which the film expands by means of the pencil-type, internal, centrally located radiant heater 22 mounted on the internal guide ring 23. Heater 22 is connected to a power source by wires leading through the conduit 27 to a power source, not shown. The tubular film 14, immediately upon reaching the orientation temperature range, starts to expand due to the pressure within it and to elongate due to the relative rates of the nip rolls 24 and the tube advancer 13. However, as the tubular film expands, its inner surface gets farther and farther away from heater 22 and its outside surface approaches the cooling ring 25. This combination of factors serves to reduce the temperature of the film. The resulting expanded and stretched tubular film is then cooled by continuing its passage through the cooling ring 25. Cooling ring 25 can contain coils to convey cooling water in its surface as in the quenching mandrel. It should be understood that neither the precise heating means nor the precise cooling means described or shown in the figure are to be construed as limitative in the present invention.

It has been found necessary in the present process to have the thicker portions at a higher temperature than the thinner portions so that such thicker portions will stretch more under the internally applied given pressure. Thin areas, because of their lower heat content, are cooled more quickly than the thick areas; therefore, with cooling, the rate of draw on the thin areas, which is initially faster than that of the thick areas, is slowed. If the cooling rate is fast enough, the rate of draw in the thick areas becomes faster than that of the thin areas before total film expansion is reached and gauge improvement begins. The period of gauge magnification is stopped sooner and at a lower transverse direction draw for the higher cooling rate than for the lower cooling rate.

Fortunately, in this process, as described, the temperature pattern reverses as the tubular film expands in the transverse direction and is stretched in the longitudinal direction above 2×. As this stretch ratio is exceeded, the thicker sections remain at a higher temperature than the thinner sections because (1) the intensity of the heat is decreasing due to the film moving away from the internal heater while it is expanding and (2) the film is becoming thinner and more transparent. Both of these conditions favor the thicker sections absorbing more heat while the thinner sections allow more heat to pass through; hence, the temperature of the thicker sections is maintained at a higher temperature than the thinner sections.

It is necessary to circulate cool air around the expanding tubing to dissipate the heat generated in the film during expansion and from the internal radiant heat source. As the temperature drops, the effective stress-strain path on which the film is elongating in two directions intersects a multiplicity of isothermal stress-strain curves. In other words, the path of the film is jumping from one isothermal stress-strain curve to another, and this effective stress-strain path is referred to as "cooling curve" stretching. Obviously, the faster the film is moving through the apparatus, the more stringent are the cooling requirements.

In high speed operation, the cooling is effected by blowing or circulating air around tubular film as it is expanding, the air being at a temperature below the lower temperature of the orientation temperature range but above the temperature which causes film breakage or which freezes or stops expansion before the tubing is stretched to the desired transverse and longitudinal direction ratios under the prevailing internal gaseous pressure and longitudinal tension.

Convection cooling, in this process, is necessary and must be present if expansion is to stop. Otherwise an unrealistically high reinforcement of the polymer would be required to arrest the thermal stretching. In this process, cooling while expanding permits reinforcement. The cooling leads to a composite or effective stress-strain path on which the tubular film in elongating in two directions intersects a multiplicity of isothermal stress-strain curves, i.e., the path made up of an infinite number of points which coincide with the isothermal curves at given temperatures. The effect and the necessity of cooling during orientation is readily recognized when observing the gauge magnification pattern. The gauge magnification pattern indicates an extremely high initial transverse direction gauge magnification followed by a progressively decreasing gauge magnification and the gauge magnification reaches a minimum as the tubular film is progressively stretched to a greater degree. A transverse direction gauge improvement is associated with cooling of the tubular film while it is being stretched. Improvement is realized because of the preferential cooling of the thin sections and attendant reinforcement of these sections. The gauge improvement, as evidenced by the decrease in the gauge magnification, occurs when cooling becomes effective. Thus, the need to initiate cooling of the tubular film at the plane of initial transverse direction expansion is observed and "cooling curve" stretching is accomplished.

The internal radiant heater is a key component in this process. It is used to complete the tubular film reheat to the orientation temperature under the given internal pressure and to control the bubble shape and size in conjunction with the convection cooling. The use of a disc or pancake-type radiant heater will aid in concentrating the plane of maximum radiant intensity, and further aids in stabilizing the plane of initial transverse direction expansion. The radiant heating and film temperature profiles indicate that the point of impingement of the cooling air should be located at the plane of initial transverse direction stretching or plane of initial expansion.

An effective stress-strain path for this process is shown for polyethylene in FIGURE 2 and polypropylene in FIGURE 4. Since the stress-strain properties change only slightly with strain rate, a strain rate of 2000% per minute is used for purposes of illustration. Each of the effective stress-strain paths have been correlated with a corresponding film temperature profile for each of these polymers, illustrated respectively in FIGURES 3 and 5.

Subdividing the orientation (stretching) zone incrementally, the film temperature profile can be used to determine the localized heat transfer coefficient or cooling velocity profile. The cooling heat transfer coefficient necessary to maintain a given film temperature profile with a given incident radiant intensity in the expansion zone at an ambient air velocity can be determined. By varying the heat transfer coefficient from the determined value, a series of relationships can be developed indicating the film temperature (under the same incident radiant intensity) if the cooling air heat transfer coefficient (or velocity) is reduced. These determinations and relationships illustrate that the cooling air impingement should be at the plane of maximum radiant intensity since in this plane the tubular film is hottest or nearest its melting point. Thus, best results can be obtained by impinging the maximum cooling air velocity at the plane of maximum internal radiant intensity and by reducing the air velocity along the bubble shape based on the radiant intensity and the thickness of the film. An external shield can be used to reduce the air velocity along the bubble surface based upon a predetermined desired bubble shape.

The effect of cooling air temperature on the heat transfer coefficient necessary at the plane of impingement of the cooling air illustrates that a lower cooling air temperature will slightly reduce the heat transfer coefficient necessary at the incident radiant intensity to maintain a specific film temperature. Reducing the film temperature below that designated by the predetermined shape will alter the effective stress-strain path. The effect of gauge control on the film temperature for two points designated along the bubble profile can be determined and calculated. A thick region tends to heat and a thin region tends to cool under the influence of the internal radiant intensity and the convection cooling. The compensating effect of this process is evident by comparison of the relationships of the film temperature at varying gauges at the two respective positions along the bubble profile indicating that there is a greater temperature differential for the same variation in gauge for a greater degree of expansion and that the thicker region remains hotter.

The process operability and capacity is determined by the controlled convection cooling of the film during expansion. Air for this purpose can be introduced at the base of the external reheat system. Since the air supplied by the forced air heaters at the base of the external heater has to pass through the heater zone before impinging on the expanding film, the air is hotter than desired for maximum process operability. Consequently, the ability to orient at high throughput rates is limited by the high temperature of the air impingement on the tubular film in the expansion zone. In order that the air might impinge at the plane of maximum radiant intensity and the initial transverse direction expansion area, an air cooling air ring is installed above the external reheat section as shown in FIGURE 1 to provide more effective cooling for the expanding tubular film.

Circulating the bubble air will provide cooling on the interior of the tubular film. The bubble air can be continually fed and withdrawn through 20 and 21.

The limits of the process are defined by the expansion of the tubular film corresponding to an effective stress-strain path on which the film elongating in two directions intersects a multiplicity of isothermal stress-strain curves, from the initial orientation temperature stress-strain curve to the final temperature stress-strain curve at which point the maximum transverse direction expansion has occurred, or in other words the effective stress-strain path is made up of an infinite number of points which coincide with the isothermal curves at the corresponding temperatures. This definition permits satisfactory process operation within a broad range of incident radiant heat intensities and convection cooling heat transfer coefficients during expansion with given internal gaseous pressures.

One limit, as exemplified in the foregoing disclosure, isothermal or adiabatic condition for expansion is to be avoided. If expansion occurs under an isothermal or adiabatic condition, at a given pressure, the tubular film ruptures. Thus, with the tubular film exposed to the radiant heat and convection cooling during expansion, an isothermal or adiabatic condition is avoided.

On the other limit, with exposure to radiant heat and convection cooling during expansion with a given internal pressure, if the cooling is too great the temperature of the film drops and causes the tubular film to freeze or stop the expansion before the tubular film expands to the desired ratio, i.e., with the given internal pressure, the pressure will not be great enough to force the transverse direction expansion to the desired ratio. In a tubular orientation process a unitary pressure by necessity must be maintained.

Cooling during transverse direction orientation is also applicable to flat films. By way of illustration, polyethylene terephthalate can be stretched in the transverse direction in a tenter frame under this principle. Heating the flat polyethylene terephthalate film can be accomplished by use of incident radiant heat. In the tubular form, the film automatically moves away from the radiant heat source as it expands. Consequently, to maintain the same type of heating pattern, the radiant heater, while extending across the width of the flat film, correspondingly must be progressively increasing in distance from the film or, if at a uniform distance, must have a programmed decrease in radiant intensity along the length of the film expansion zone.

The convection cooling by air throughout the expansion zone similarly should be programmed to give the desired cooling field for the film. The air can be on one side only, but preferably on both sides with the air flow cocurrent, countercurrent or transverse to the machine direction. An effective stress-strain path, as illustrated previously, can be obtained in this manner. The flat film is heated to within its orientation temperature range by the incident radiant heat source, stretched while exposed to the incident radiant heat source and convection cooled by the air flow. This provides "cooling curve" stretching, i.e., stretching the flat film correspondingly to an effective stress-strain path on which the elongating film intersects a multiplicity of isothermal stress-strain curves from the initial orientation temperature isothermal stress-strain curve to the final temperature isothermal stress-strain curve at which point the maximum transverse direction stretch has occurred.

By adhering to the limits of the process of the present invention, several surprising results are at once apparent. The resulting biaxially oriented film does not display the usual magnified gauge variations normally accompanying film-blowing processes. That is, gauge variations, almost unavoidable during extrusion, are not magnified as in prior art blowing processes by the expansion process of the present invention. Another unexpected result is that polypropylene and other crystalline polymers which heretofore had suffered from "line drawing" when stretched by expanding the tubular film, do not suffer from this fatal shortcoming when subjected to the process of the present invention.

The following examples serve to illustrate the present invention, Example 1 being the best mode contemplated for practicing the invention.

Example 1

Molten polypropylene having a density of 0.906 * was extruded at a temperature of 225° C. and at a rate of 10 pounds per hour from a 1-inch extruder through a 2⅛ inch circular die having a 45-mil lip opening. The apparatus was substantially that shown in the drawing. The extruded tubular film was quenched to the nonformative plastic state by being passed over a nominal 2-inch tapered internal mandrel at a temperature of about 10° C., the taper of the mandrel being 4 mils per inch. The tubular film was withdrawn from the die over the internal mandrel by a tube advancer operating at 2.5 feet per minute. Air was injected and vented to the atmosphere through connections in the end of the quench mandrel. The resulting open bubble system provided a pressure of 22 inches of water within the tubular film. As the tubular film cooled over the internal mandrel, it shrank in diameter. This shrinkage, together with the taper of the mandrel, served to prevent the air injected at the end of the mandrel from exerting pressure on the molten tubular film in the area adjacent the die.

After passing through the tube advancer, the tubular film was led through an external tapered guide ring 6 inches long and 2 inches in diameter to minimize sway and maintain the tube concentric with the external initial heater. The tubular film was then passed into an initial heating zone where it was heated to a temperature of 130° C. The initial heating zone was composed of several external radiant heaters that surrounded the film and a forced air heater. The radiant heaters were each 12 inches high, 10 inches in diameter, rated at 6500 watts and operated at 25% capacity. The forced air heater, which was located just upstream of the radiant heaters, forced air at a temperature of about 160° C. and at a rate of about 1,200 feet per minute against the outside surface of the tubular film.

Immediately after passing through the initial heating zone, the tubular film was passed into the final heating zone where it was heated to a temperature of about 155° C. Heating was provided by a pencil-type internal radiant heater 7 inches long, rated at 650 watts, operated at 72% capacity and having a surface temperature of 620° C. At the internal pressure of 22 inches of water and at the temperature of 155° C., the tubular film stretched and expanded. Stretching of six times its original length was accomplished by a set of nip rolls that drew the film at a rate of 15 feet per minute. Expansion to a diameter of 12 inches took place due to the internal pressure of 22 inches of water at this temperature.

The major amount of cooling was accomplished by passing the expanded film through a water-cooled ring 10½ inches long and 12½ inches in diameter which served to cool the expanded and stretched film to a temperature of about 40° C. The tubular film which had been elongated six times in both the transverse and longitudinal directions was finally collapsed as it passed through the nip of a set of nip rolls and was finally wound on a roll.

The film having a thickness of 0.8 mil displayed the following properties:

|  | Longitudinal Direction [1] LD | Transverse Direction [2] TD |
|---|---|---|
| Tensile strength (lbs./sq. in.) | 26,700 | 26,500 |
| Elongation (percent) | 94 | 68 |
| Initial tensile modulus (lbs./sq. in.) | 395,000 | 340,000 |
| Impact strength (kgs.-cm./mil) | 34.7[3] | |
| Shrinkage (percent) | 3.3 | 9.6 |

[1] In the direction of movement of the film through the apparatus.
[2] Perpendicular to the longitudinal direction.
[3] Independent of direction.

*Tensile strength, elongation and initial tensile modulus* are normally measured at 23.5° C. and 50% relative humidity, although they may also be measured at other specified temperatures and humidities. They are determined by elongating the film sample in an Instron tensile tester at a rate of 100% per minute until the sample breaks. The force applied at the break in p.s.i. is the tensile strength. The elongation is the percent increase in the length of the sample at breakage. Initial tensile modulus in p.s.i. is directly related to the film stiffness. It is obtained from the slope of the stress-strain curve at an elongation of 1%. Both tensile strength

* "Pro-fax 6512E."

TABLE IV

| | Example | | | |
|---|---|---|---|---|
| | 2 | 3 | 4 | 5 |
| | Polymer | | | |
| | Esso (266C)[1] | Kopper Super Dylan 6015[2] | 75% Alathon 14 25% A-71X[3] | Polyvinyl Chloride[4] |
| Extrusion Temp. (° C.) | 225 | 215 | 215 | 190 |
| Quench Temp. (° C.) | 25 | 25 | 25 | 25 |
| Initial Diameter (inches) | 2 | 2 | 2 | 2 |
| Initial Rate of Drawing (ft./min.) | 2.6 | 2.5 | 2.5 | 2.5 |
| Temp. of Film in Initial Heating Zone (° C.) | 125 | 115 | 100 | 80 |
| Surface Temp. of External Quartz Heater (° C.) | 250 | 280 | 320 | 200 |
| Bubble Pressure (Inches of water) | 24 | 8 | 6 | 8 |
| Temp. of Film in Final Heating Zone (° C.) | 150 | 125 | 115 | 90 |
| Surface Temp. of Internal Radiant Heater (° C.) | 610 | 570 | 350 | 700 |
| Final Diameter (inches) | 10 | 12 | 10 | 4 |
| Final Rate of Drawing (ft./min.) | 13 | 14.5 | 12.5 | 8 |
| Amount of LD stretch | 5× | 6× | 5× | 3.2× |
| Amount of TD stretch | 5× | 6× | 5× | 2.0× |

[1] Linear polypropylene having a density of 0.902.
[2] Linear polyethylene having a density of 0.954.
[3] 75% of polyethylene having a density of 0.915 and 25% of polyethylene having a density of 0.958.
[4] A composition containing 92% polyvinyl chloride, 4% lauryl mercaptan and 4% beta-pinene.

and initial tensile modulus are based upon the initial cross-sectional area of the sample.

*Pneumatic impact strength* or *impact strength* is the energy required to rupture a film. It is reported in kilograms-centimeters per mil thickness of the sample. The pneumatic impact strength is determined by measuring the velocity of a ball mechanically accelerated by air pressure, first in free flight and then in a flight impeded by rupturing the test sample. In this test, the film sample is 1¾" x 1¾". The projectiles are steel balls ½" in diameter and weighing 8.3 grams. The free flight velocity is 23 meters per second. The velocities are measured by timing photoelectrically the passage of the steel balls between two light beams set a definite distance apart. The pneumatic impact strength is measured by the loss in kinetic energy due to the rupturing of the test sample. It is calculated from the following formula:

Constant × (Square of velocity in free flight — square of velocity in impeded flight)

where the constant is directly proportional to the weight of the projectile and inversely proportional to the acceleration due to gravity. This test is carried out at 23° C. and 50% relative humidity and the test samples are conditioned for 24 hours at 23° C. and 50% relative humidity.

*Shrinkage* is a measure of the form-stability of the film. Ten sample strips, 2.5" x 5" each, from each direction, i.e., ten having the longer dimension running in the machine or longitudinal direction or the direction in which the film was extruded and ten having the longer dimension running in a direction transverse to the machine direction, are supported from two adjacent corners and suspended in boiling water for 1 second. The dimensional change is then noted, and percent shrinkage is calculated based on the original dimension.

*Examples 2–5*

Example 1 was repeated using different polymeric materials in substantially similar equipment as that shown in Example 1. The particular polymeric materials and the specific operating conditions are summarized in Table IV.

The thickness and the physical properties of the films resulting in Examples 2–5 are presented in Table V.

TABLE V

| Example | 2 | 3 | 4 | 5 |
|---|---|---|---|---|
| Thickness (mils) | 1.2 | 0.8 | 0.9 | 1.0 |
| Tensile Strength (p.s.i.×10⁻³) LD/TD | 19.1/20.4 | 12.5/13.9 | 11.6/7.8 | 14.2/24.9 |
| Elongation (percent) LD/TD | 88/104 | 114/80 | 92/143 | 50/21 |
| Initial Tensile Modulus (p.s.i.×10⁻³) LD/TD | 219/232 | 242/328 | 57/55 | 405/602 |
| Impact Strength (kg.-cm./mil) | 5.4 | 2.9 | 2.4 | 2.4 |
| Shrinkage (percent) LD/TD | 2.1/5.5 | 4.9/5.5 | 16/24 | 25/50 |

*Examples 6 and 7*

These examples were done using substantially similar equipment as that shown in FIGURE 1. Example 6, polyethylene, was stretched in accordance with an effective stress-strain path as illustrated in FIGURE 2. Example 7, polypropylene, was stretched in accordance with an effective stress-strain path as illustrated in FIGURE 5. The particular polymeric materials, specific operating conditions and the thickness and physical properties of the resulting films are presented in Table VI.

TABLE VI

| | Example | |
|---|---|---|
| | 6 | 7 |
| | Polymer | |
| | 75% A7020 25% A1413 [1] | Profax 6420 [2] |
| Rate (lbs./hr.) | 16.4 | 11.0 |
| Extrusion Temp. (° C.) | 220 | 215 |
| Quench Temp. (° C.) | 25 | 30 |
| Initial Diameter (In.) | 2 | 2 |
| Cast Tube Gauge Variation (percent) | 7.7 | 7.7 |
| Initial Rate of Drawing (Ft./Min.) | 4.0 | 3.3 |
| Surface Temp. of External Heater (° C.) | 468 | 620 |
| Bubble Pressure (In. of H₂O) | 11.5 | 30 |
| Temp. of Film in Orientation Zone (° C.): | | |
|   A—Initial plane of TD Expansion | 110 | 148 |
|   B—MID plane A–C | 98 | 139 |
|   C—Plane bottom of quench ring | 70 | 126 |
| Air Temp. (° C.)/Air Velocity (ft./min.): | | |
|   Orientation Zone A | 65/380 | 95/270 |
|   Orientation Zone B | 76/280 | 110/180 |
|   Orientation Zone C | 80/220 | 113/120 |
| Surface Temp. of Int. Rad. Heater (° C.) | 680 | 785 |
| Final Diameter (in.) | 10 | 10 |
| Final Tube Gauge Variation (percent) | 36 | 32 |
| Final Rate of Drawing (ft./min.) | 20 | 16.5 |
| LD Stretch | 5× | 5× |
| TD Stretch | 5× | 5× |
| Thickness (Mils) | 1.1 | 1.1 |
| Tensile Strength (p.s.i.×10⁻³) LD/TD | 11/8 | 22.7/17.5 |
| Elongation (percent) LD/TD | 76/109 | 88/115 |
| Initial Tensile Modulus (p.s.i.×10⁻³) LD/TD | 68/70 | 318/301 |
| Impact Strength (kg.-cm./mil) | | 4.8 |
| Shrinkage (percent) LD/TD 1 min. at 130° C. | 21/31 | 7/21 |
| Gloss | 70 | 77 |
| Haze (percent) | 3.8 | 3.2 |

[1] 75% of polyethylene having a density of 0.915 and 25% of polyethylene having a density of 0.958.
[2] Polypropylene having a density of 0.909.

What is claimed is:

1. The process comprising: extruding thermoplastic polymeric material in the form of a tubular sheet in its formative state; advancing the tubular sheet at a predetermined initial rate; quenching the tubular sheet to a temperature below its formative state; maintaining sufficient pressure within the tubular sheet to prevent collapse and to provide, when the tubular sheet is heated to a temperature within its orientation temperature range, an expansion to a diameter of at least 2 times the original diameter of the sheet; heating the tubular sheet internally from an internally centrally located radiant heat source to a temperature within the orientation temperature range to expand the tubular sheet to a diameter at least 2 times its original diameter, said expansion being carried out while said tubular sheet is exposed to said heat source; forcing a gas upon the tubular sheet while expanding; advancing, while expanding, the heated tubular sheet at a rate at least 2 times the initial rate of advancement; and cooling the tubular sheet while maintaining the sheet substantially at its expanded diameter.

2. The process of claim 1 wherein the forced cooling is directed at the plane of initial expansion.

3. The process of claim 1 wherein the thermoplastic polymeric material is polypropylene.

4. The process comprising: extruding thermoplastic polymeric material in the form of a tubular sheet in its formative state; advancing the tubular sheet at a predetermined initial rate; quenching the tubular sheet to a temperature below its formative state; maintaining sufficient pressure within the tubular sheet to prevent collapse and to provide, when the tubular sheet is heated to a temperature within its orientation temperature range, an expansion to a diameter of at least 2 times the original diameter of the sheet; heating the tubular sheet to a temperature between 70% of the lowest temperature of the orientation temperature range in degrees centigrade and just below the orientation temperature range of the polymeric material; thereafter, heating the tubular sheet internally from an internally centrally located radiant heat source to a temperature within the orientation temperature range to expand the tubular sheet to a diameter at least 2 times its original diameter, said expansion being carried out while said tubular sheet is exposed to said heat source; forcing a cooling gas upon the tubular sheet while expanding; advancing, while expanding, the heated tubular sheet at a rate at least 2 times the initial rate of advancement; and cooling the tubular sheet while maintaining the sheet substantially at its expanded diameter.

5. The process of claim 4 wherein the convection cooling is directed at the plane of initial expansion.

6. The process comprising: extruding thermoplastic polymeric material in the form of a film in its formative state; advancing the film at a predetermined rate; quenching the film to a temperature below its formative state; heating the film to a temperature within the orientation temperature range from a radiant heat source; stretching the film in at least the transverse direction to an extent of at least 2 times the original dimension of the film while the film is exposed to the radiant heat source; forcing a cooling gas upon the film surface while stretching in the transverse direction; and cooling the film while maintaining the film substantially at its stretched dimension.

7. The process comprising: extruding thermoplastic polymeric material in the form of a film in its formative state; advancing the film at a predetermined rate; quenching the film to a temperature below its formative state; heating the film to a temperature within the orientation temperature range from a radiant heat source; stretching the film in at least the transverse direction to an extent of at least 2 times the original dimension of the film while the film is exposed to the radiant heat source, the effective radiant heat intensity decreasing with increasing distance from the plane of initial stretching; forcing a cooling gas upon the film surface while stretching in the transverse direction; and cooling the film while maintaining the film substantially at its stretched dimension.

8. The process of claim 7 wherein the forced cooling is directed at the plane of initial stretching.

9. The process comprising: extruding thermoplastic polymeric material in the form of a film in its formative state; advancing the film at a predetermined rate; quenching the film to a temperature below its formative state; heating the film to a temperature within its orientation temperature range; stretching the film in the longitudinal and transverse directions to an extent of at least 2 times the original dimensions of the film to orient the film; continuing heating the film, while stretching at least in the transverse direction, from a radiant heat source, the effective radiant intensity decreasing with increasing distance from the plane of initial stretching, to a temperature within the orientation temperature range, forcing a cooling gas upon the film surface while stretching at least in the transverse direction; and cooling the film while maintaining the film substantially at its stretched dimension.

10. The process of claim 9 wherein the forced cooling is directed at the plane of initial stretching.

11. The process comprising: extruding thermoplastic polymeric material in the form of a tubular sheet in its formative state; advancing the tubular sheet at a predetermined initial rate; quenching the tubular sheet to a temperature below its formative state; maintaining sufficient pressure within the tubular sheet to prevent collapse and to provide, when the tubular sheet is heated to a temperature within its orientation temperature range, an expansion to a diameter of at least two times the original diameter of the sheet; heating the tubular sheet internally from an internally centrally located radiant heat source around its circumference to a temperature within the orientation temperature range to expand the tubular sheet to a diameter at least two times its original diameter and to maintain the thicker portions of the tube wall at a higher temperature than the thinner portions of the tube wall so that the thicker portions stretch to a greater extent, said expansion being carried out while said tubular sheet is exposed to said heat source; forcing a cooling gas upon the tubular sheet while expanding; advancing, while expanding, the heated tubular sheet at a rate at least two times the initial rate of advancement; and cooling the tubular sheet while maintaining the sheet substantially at its expanded diameter.

References Cited by the Examiner

UNITED STATES PATENTS

| | | | |
|---|---|---|---|
| 2,862,234 | 12/1958 | Gerber | 264—95 XR |
| 2,987,767 | 6/1961 | Berry | 18—14 XR |
| 3,108,851 | 10/1963 | Hofer | 264—209 |
| 3,141,912 | 7/1964 | Goldman et al. | 264—95 |

FOREIGN PATENTS

| | | |
|---|---|---|
| 840,191 | 7/1960 | Great Britain. |

ROBERT F. WHITE, *Primary Examiner.*

ALEXANDER H. BRODMERKEL, *Examiner.*